Nov. 7, 1933.  J. F. STEELE  1,933,769

HOSE COUPLING

Filed June 10, 1931

INVENTOR.
Joseph F. Steele
BY
M. J. Graham
ATTORNEY

Patented Nov. 7, 1933

1,933,769

UNITED STATES PATENT OFFICE 1,933,769

HOSE COUPLING

Joseph F. Steele, San Francisco, Calif.

Application June 10, 1931. Serial No. 543,294

1 Claim. (Cl. 285—86)

This invention relates to terminal fittings for hose, usually referred to as hose couplings and more particularly to fittings for internally armored hose by means of which the hose may be adapted for easy and convenient and releasably tight connection to various fittings and devices.

Such hose as herein referred to is well known and extensively used, one type of which includes a flexible tubular body of water-proof material, lined longitudinally of its interior by a helically wound metal strip in the nature of a channel-iron, the flanges of which interengage so that the helical coils may have movement relative to each other, and thus provide for flexibility in a metal lined hose.

One of the uses to which such a hose is extensively put is in conducting gasoline or other liquids, which, by their nature, should be isolated from the water-proofing material, such as rubber and fabric, as found in the ordinary flexible hose, because of the harmful effects of such liquids on such materials, and also to prevent disintegrated particles of the rubber or fabric from passing into the stream of gasoline or other fluid.

Because of the inflammable nature of many of the fluids for which this tubular hose is used, it is customary, and is required by law in many localities, to have such hose electrically grounded, so that in case of a spark, caused electrically or by frictional contact, the electrical current will be conducted along and through the metal lining of the hose and to the electrical ground, and thus be dissipated. For this reason, it is desirable, though not essential, that the metal portions of the hose couplings herein described should be made of brass or some analogous composite metal which is very slow to create a spark from sharp frictional contact.

The objects of the invention are to produce a hose coupling especially adapted for joining a tubular metal lined hose to a discharge nozzle or to another length or piece of hose or to other suitable fitting; to provide a coupling with a shank portion which will not radially distend a hose at point of connection; to provide a coupling which will form a perfectly tight or releasable metal-to-metal bond with the internal lining of a hose; to provide a coupling which, when used with an internal lined hose will provide for the rubber and fabric portion of the hose end making its own washer or packing gland against the coupling; to provide in a coupling a hose-binder ring or collar which is adjustable for varying sizes of hose diameter without projecting points; to provide such a hose coupling which can be readily and easily mounted and demounted at a field of operation with practically no tools and which does not require hammering or twisting of thimbles into a hose end, such as many hose connections require where it is necessary to radially distend the hose end for attachment of the coupling.

With the above mentioned and other objects in view, the invention consists in the novel construction and combination of parts hereinafter described, illustrated in the accompanying drawing and pointed out in the claim hereto appended; it being understood that various changes in the form, proportion, size and minor details of construction within the scope of the claim may be resorted to without departing from the spirit or sacrificing any of the advantages of the invention.

To more clearly comprehend the invention, reference is directed to the accompanying drawing, wherein—

Figure 1:
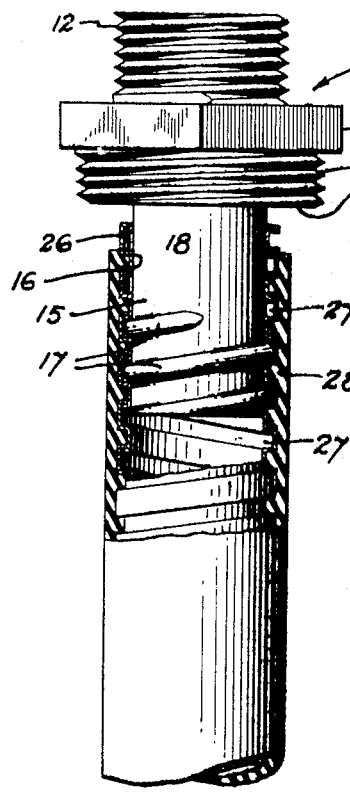
Fig. 1 is a longitudinal section of hose broken away to show the coupling in elevation.
Figure 2:
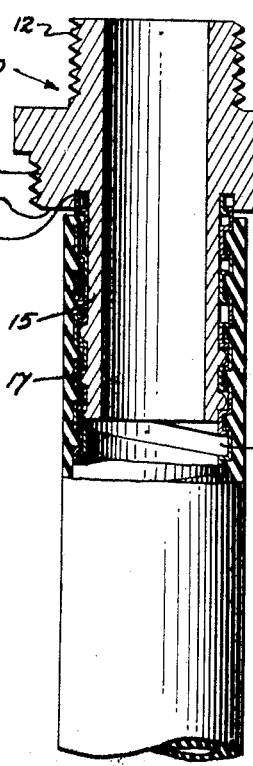
Fig. 2 is a longitudinal section of hose and coupling mounted therein, and showing the normal position of the coils of the interior armor.

Referring to the drawing, wherein like characters of reference designate corresponding parts, 10 generally indicates a main body portion which in the preferred exemplification herein comprises a nut or hand grip 11 forwardly of which is a threaded coupling head 12 and rearwardly of which is an annularly threaded portion 13 which forms a shoulder 14, and depending from which is a shank 15 which preferably has its longitudinal exterior walls parallel at opposite portions, as indicated at 16.

Adjacent the end of the shank farthest removed from the main body is provided a helical thread 17 which is preferably of a pitch substantially equal to the pitch of the helical coils in the hose to which the coupling is to be attached. Between the coils 17 and the shoulder 14, the shank is provided with an area 18 which is devoid of the helical threads. An annular recess 19 is provided in the body portion 13, said recess being formed in the face of the shoulder portion 14 and circumferentially of the shank 15.

An annular collar 20 is adapted to slide longitudinally of the hose, said collar having interior walls parallel at opposite portions, and outer walls tapered so that said collar is frusto-conical exteriorly. The collar 20 is preferably of expansible and contractible material, so that it has radial elasticity by means of overlapping portions, indicated 21 and 22, providing therebetween a slit longitudinally of the collar, said slit extending transversely through the body wall of the collar on an arcuate line in plan, as indicated 23 in Fig. 5.

A sleeve 24 is provided to slide longitudinally of the hose and which has its inner wall conically tapered, as at 24ª, to correspond substantially with the exterior conical taper of the collar 20. At its forward end the sleeve 24 is provided with threads 25 adapted to engage the threaded portion 13.

In operation, the sleeve 24 is first placed circumferentially of the hose, and secondly the collar 20 is likewise placed circumferentially of the hose, and slid longitudinally thereof away from the end of the hose, which is to be connected.

It is preferable to cut away a small portion of the outer fiber and rubber coating at the end of the hose so as to leave a portion of the interior metal lining extending beyond the outside covering, as shown at 26. The shank 15, including the helical thread 17, is then inserted in the hose end, which is accomplished very easily because of the fact that the helical threads are guided by the grooves 27 of the metal lining and because the outer walls of the shank are of less diameter throughout their length than the inner diameter of the hose and its metal lining, so that a mere manual rotation of the body 10 is sufficient to completely seat the shank tightly within the hose end.

As the threads 17 draw the shank body tight within the hose, the extended metal portion 26 of the metal lining is received within the recess 19 of shoulder 14, and thereby makes an additional metal-to-metal bond between the coupling and the metal lining, the latter of which, as above stated, is provided with an electrical ground at the opposite end of the hose.

Figure 3:
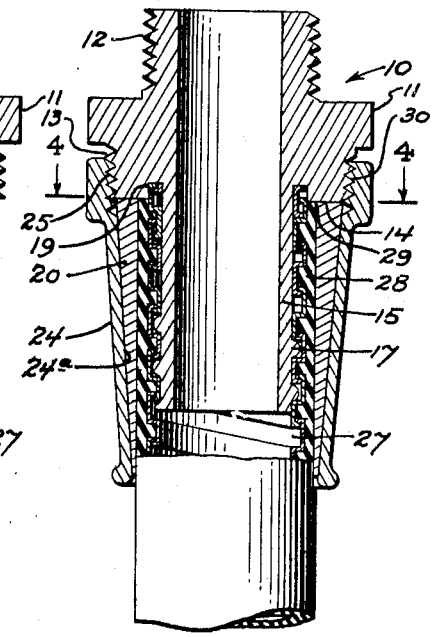
Fig. 3 is a longitudinal section of hose showing the coupling completely mounted therein with the coils of the interior armor compressed adjacent the end of the hose.
Figure 4:
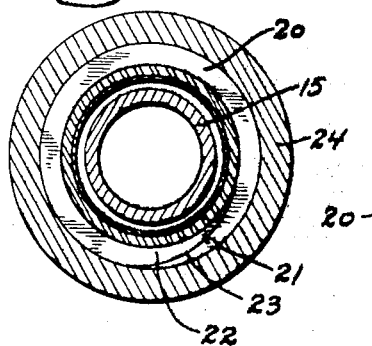
Fig. 4 is a plan section taken on line 4—4 of Fig. 3.

It will be noted, as best shown in Fig. 3, that as the shank is advanced within the hose by reason of the helical threads, the forward end portion of the metal lining is compressed at its interengaging joints, and thus permits the end of the outer covering 28 to contact very tightly with the shoulder 14 of the body 10, and thus provides for a self-sealing contact of the resilient covering 28 with the shoulder 14, whereby the hose makes its own washer or packing gland against the metal, as shown at 29.

The collar 20 is then advanced forwardly until the base of the frustum contacts with the shoulder 14, the joint 21 permitting expansion of the collar in case the outer diameter of the hose is somewhat oversize. The sleeve 24 is then moved forward so that its tapered inner diameter engages the tapered outer diameter of the collar; and the sleeve is releasably connected to the threaded portion 13 by means of cooperating threads 30 internally of the base portion of the sleeve cone.

In case the outer diameter of the hose is somewhat undersize, the tapered joint 21 of the collar 20 permits the collar to contract as the sleeve is advanced to its threaded seat.

Figure 5:
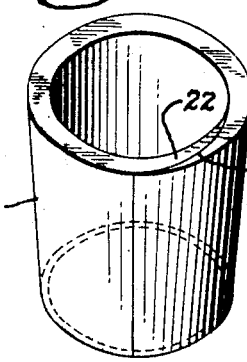
Fig. 5 is a perspective detail of tapered collar or hose binder.

It is preferred that the tapered joint 21 be formed arcuately, as best shown in Fig. 5, so that breaks may be eliminated in the continuous circumference of the collar, and also in order that the inner and outer walls of the collar may be constantly parallel, and thus avoid projecting points upon radial contraction of the collar or gaps upon radial expansion of the collar.

Figure 6:
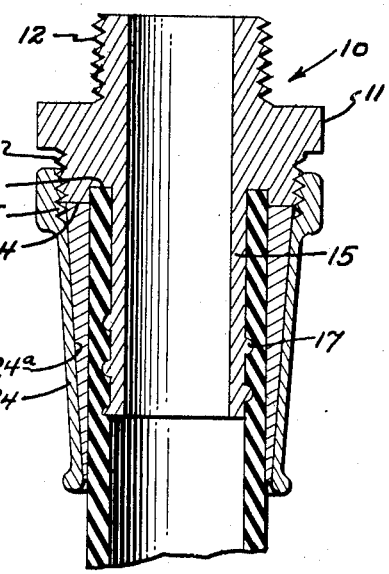
Fig. 6 is a broken longitudinally sectioned view of hose end portion with fittings, showing a modified use of the invention.

While the invention herein is described with especial relation to a metal-lined hose to which it is particularly adapted, it is to be understood that it is also adaptable to use with a hose having a resilient lining such as is commonly termed rubber hose or fabric hose, and in that event the helical thread 17 of the shank embeds into the body of the hose, as shown in Fig. 6.

Having thus described the invention what is claimed as new and desired to be protected by Letters Patent is:—

In a hose coupling, a device for gripping a hose body comprising a tapered collar adapted for slidably mounting circumferentially exterior of a hose body, said collar being split longitudinally throughout the length of its body wall and said split having overlapping arcual opposing faces.

JOSEPH F. STEELE.